US012747360B2

(12) United States Patent
Springer et al.

(10) Patent No.: US 12,747,360 B2
(45) Date of Patent: Sep. 29, 2026

(54) ENERGY CURABLE COMPOSITION AND METHOD OF USING THE SAME

(71) Applicant: MSI Coatings, Inc., Elbert, CO (US)

(72) Inventors: Matthew Kent Springer, Elbert, CO (US); Neil Brian Cramer, Boulder, CO (US)

(73) Assignee: MSI Coatings, Inc., Elbert, CO (US)

(*) Notice: Subject to any disclaimer, the term of this patent is extended or adjusted under 35 U.S.C. 154(b) by 0 days.

(21) Appl. No.: 18/964,614

(22) Filed: Dec. 1, 2024

(65) Prior Publication Data

US 2025/0197652 A1 Jun. 19, 2025

Related U.S. Application Data

(63) Continuation of application No. 16/870,638, filed on May 8, 2020, now Pat. No. 12,157,831, which is a continuation-in-part of application No. 16/046,572, filed on Jul. 26, 2018, now abandoned.

(60) Provisional application No. 62/845,105, filed on May 8, 2019, provisional application No. 62/537,319, filed on Jul. 26, 2017.

(51) Int. Cl.

| | |
|---|---|
| ***C09D 5/18*** | (2006.01) |
| ***C09D 4/00*** | (2006.01) |
| ***C09D 133/04*** | (2006.01) |

(52) U.S. Cl.
CPC ................ *C09D 5/18* (2013.01); *C09D 4/00* (2013.01); *C09D 133/04* (2013.01)

(58) Field of Classification Search
None
See application file for complete search history.

(56) References Cited

U.S. PATENT DOCUMENTS

| | | | | |
|---|---|---|---|---|
| 2007/0043135 A1* | 2/2007 | Preis | G03F 7/032 | 522/8 |
| 2008/0277826 A1* | 11/2008 | Chou | B82Y 40/00 | 264/293 |
| 2016/0137839 A1* | 5/2016 | Rolland | C08G 18/4854 | 522/71 |

* cited by examiner

*Primary Examiner* — Sheeba Ahmed
(74) *Attorney, Agent, or Firm* — Michael Best & Friedrich LLP

(57) ABSTRACT

The present disclosure generally relates to an energy curable composition, and more particularly to unique and novel uses of the composition such as one or two or more of the following a performance additives, clear coat, composite material, resin, top coat, improved holdout coating, a sealant coat, combinations of the same.

12 Claims, 2 Drawing Sheets

ENERGY CURABLE COMPOSITION AND METHOD OF USING THE SAME

The present application is a continuation of U.S. patent application Ser. No. 16/870,638 filed on May 8, 2020, which claims the benefits of U.S. Provisional Patent Application No. 62/845,105 filed on May 8, 2019, and is a Continuation-in-Part of U.S. patent application Ser. No. 16/046,572, which claims the benefits of U.S. Provisional Application Ser. No. 62/537,319, filed Jul. 26, 2017, each of the above-identified applications are fully incorporated herein by reference in their entireties for all purposes.

CROSS-REFERENCE TO RELATED APPLICATIONS

The present application is related to U.S. patent application Ser. No. 15/593,985, filed May 12, 2017, U.S. Provisional Patent Application No. 62/335,823 filed May 13, 2016, U.S. Provisional Application Ser. No. 62/382,968 filed Sep. 2, 2016, U.S. Provisional Application Ser. No. 62/413,199 filed Oct. 26, 2016, U.S. Provisional Application Ser. No. 62/430,125 filed Dec. 5, 2016, U.S. Provisional Patent Application No. 62/452,093 filed Jan. 30, 2017, each of the above-identified provisional patent applications are hereby fully incorporated herein by reference.

BACKGROUND OF THE INVENTION

Field of the Invention

The present disclosure generally relates to a radiation curable composition, and more particularly to unique and novel uses of the composition such as one or two or more of the following: a fire retardant, clear coat, composite material, resin, top coat, improved holdout coating, a sealant coat, and combinations of the same.

SUMMARY OF THE INVENTION

Accordingly, the invention is directed to a radiation curable composition and method of using the same that substantially obviates one or more of the problems due to limitations and disadvantages of the related art.

An advantage of the invention is to provide a coated substrate material with a radiation curable composition.

Another advantage of the invention is to provide a method of using a radiation curable composition.

Another advantage of the invention is to provide a method of using a radiation curable composition that cures in an oxygen environment at sixty seconds to tack free coating.

Still yet another advantage of the invention is to provide a radiation curable composition that has more than one use in a single coating.

Still yet another advantage of the invention is to provide a radiation curable composition that is a clear coat and fire retardant.

Still yet another advantage of the invention is to provide a radiation curable composition that is a clear coat and improves holdout.

Still yet another advantage of the invention is one or more of faster production speeds and capacity, reduction of work-in-process, dramatically reduced set-up/clean-up labor compared to related art, environmentally friendly, energy savings, no emissions controls, less floor space needed and increase yield and reduce scrap.

Still yet another advantage of the invention is to provide a coated substrate or article where the coated article includes a cured coating that has one or more of the following attributes: it is a chemically resistant coating, a sealant coating, a non-permeable coating, a fire retardant coating, an improved holdout coating, a tack free coating, and a pigmented coating.

To achieve these and other advantages and in accordance with the one aspect of the present disclosure, as embodied and broadly described, one implementation of the disclosure is directed towards an article having an energy curable composition, e.g., a volatile organic compound (VOC) free composition. Optionally and/or alternatively, in one embodiment, the article includes a substrate and a low radiant flux energy, e.g., less than 10 W/cm2 on the substrate, the coating comprising an acrylate monomer or oligomer component; a thiol monomer or oligomer component; a photoinitiator component; a radical inhibitor component; a surface additive component and potentially other performance additives.

In another aspect of the present disclosure, one implementation is directed towards a protected surface. The surface includes a cured coating on said surface. The cured coating being formed from a flowable composition including an acrylate monomer or oligomer component; a thiol monomer or oligomer component; a photoinitiator component; a radical inhibitor component; a surface additive component; and being curable an energy source having a wavelength in a range from about 360 nm to about 420 nm and a radiant flux at the surface of the coating of about 100 $mW/cm^2$ or less to cure within about 120 seconds or less.

In yet another aspect of the present disclosure, one implementation includes a method of using volatile organic compound (VOC) free low radiant flux UV curable composition as a fire retardant coating to improve a fire retardant nature of a substrate. The method includes applying the VOC free low radiant flux UV curable composition on the substrate to form a fire retardant coating. The applied coating is cured by applying an energy source having a wavelength in a range from about 360 nm to about 420 nm and a radiant flux at the surface of the coating of about 100 $mW/cm^2$ or less to cure the fire retardant coating within about 120 seconds or less. The VOC free low radiant flux UV curable composition includes an acrylate monomer or oligomer component; a thiol monomer or oligomer component; a photoinitiator component; a radical inhibitor component; and a surface additive component.

This Summary section is neither intended to be, nor should be, construed as being representative of the full extent and scope of the present disclosure. Additional benefits, features and embodiments of the present disclosure are set forth in the attached figures and in the description hereinbelow, and as described by the claims. Accordingly, it should be understood that this Summary section may not contain all of the aspects and embodiments claimed herein.

Additionally, the disclosure herein is not meant to be limiting or restrictive in any manner. Moreover, the present disclosure is intended to provide an understanding to those of ordinary skill in the art of one or more representative implementations supporting the claims. Thus, it is important that the claims be regarded as having a scope including constructions of various features of the present disclosure insofar as they do not depart from the scope of the methods and apparatuses consistent with the present disclosure (including the originally filed claims). Moreover, the present disclosure is intended to encompass and include obvious improvements and modifications of the present disclosure.

BRIEF DESCRIPTION OF THE DRAWINGS

The accompanying drawings, which are included to provide a further understanding of the invention and are incorporated in and constitute a part of this specification, illustrate implementations of the disclosure and together with the description serve to explain various aspects of the invention.

In the drawings.

DETAILED DESCRIPTION OF THE ILLUSTRATED EMBODIMENTS

Figure 1:
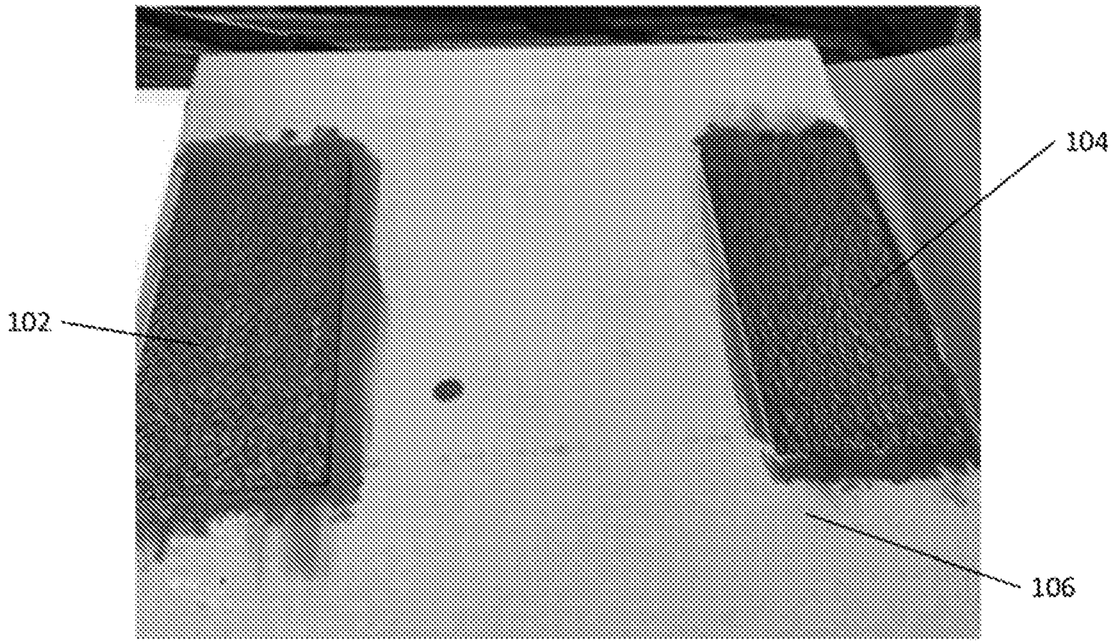
FIG. 1 illustrates a side perspective view of a mixing apparatus according to an example of the present disclosure.

The disclosure can provide a number of advantages depending on the particular aspect, embodiment, and/or configuration. These and other advantages will be apparent from the disclosure.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

It is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

In one embodiment, the energy curable composition can be formulated into a variety of compositions in embodiments of the invention where the composition includes the following components:

1. Acrylate monomers/oligomers having a range from about 40%-94% by weight of total composition or less.
2. Thiol monomers/oligomers having a range for about 0%-40% by weight of total composition.
3. Photoinitiator having a range from about 1%-20% by weight of total composition.
4. Radical inhibitors having a range from 0%-0.5% by weight of total composition.
5. Surface additive to reduce surface tension from about 0%-10% by weight of total composition.

Other Optional Components:

6. One or more performance additives having a range from about 0%-20% or greater by weight of total composition.
7. Optional glass/silica fillers having a range used as a viscosity modifier, e.g., a paste a high percentage having a from about 0%-60% by weight of total composition.
8. Optional pigments.

The energy curable composition is preferably mostly or entirely solids. That is, the composition includes at least about 95% by weight solids, preferably at least about 98% by weight solids, and more preferably about 100% by weight solids, based upon the total weight of the composition taken as 100% by weight. The composition may have a viscosity [cps] at 25 C in a range from about 20 [cps] to about 1,000,000 [cps] or more, and in a preferred embodiment the viscosity 30 [cps] to 400 [cps] or more. The energy curable composition may be in any form including for example, pre-impregnated composite fiber, pre-impregnated sheets or rolls, sprayable, paintable, laminating, paste, rollable, and moldable varieties of viscosity.

In one embodiment, the energy curable composition is cured into a tack-free coating cured with UV or Visible light irradiation from relatively low intensity light sources. It cures rapidly to form a glassy high modulus optically clear material. Excellent for use in protective coatings, optical and outdoor applications. Non-yellowing and low oxygen inhibition.

Optionally and/or alternatively, the energy curable composition can be reduced, e.g., with alcohol, such as isopropyl alcohol, for application purposes.

In one embodiment, the energy curable composition is used to form a UV cured coating formed by applying a radiation energy source in a range from about 360 nm to about 420 nm at a surface power density less than about 40 $mW/cm^2$ for time of 120 seconds or less or greater to form a UV cured coating. In a preferred embodiment, the radiation energy source is a LED light emitting energy in a range from about 10 $mW/cm^2$ to about 40 $mW/cm^2$ or less on a surface of substrate coated with a composition.

The composition is useful to coat substrates, such as cement, wood, ceramics, glass, polyolefins, polyamides, polyimides, polyfluoro plastics, stainless steel and the like. More specifically, the composition can be a low-oxygen inhibited rapid cure to form an abrasion and scratch resistant and durable coating. The composition cures to a tack free coating in the presence of oxygen with an energy source and predetermined radiant flux at the surface.

In one embodiment, the composition can be cured with an energy source have an output energy measure at or near the surface of the composition to be cured is in range from about 1 $mW/cm^2$ to about 10 $W/cm^2$ or greater. The output of the energy source can be UVA, UVB, UVC energy or any combination. In one embodiment, the output energy used to cure the composition has a wavelength in range from about 355 nm to about 420 nm. It is believed the output energy is inversely proportionally to the distance from surface of composition to be cured. Optionally and/or alternatively, the energy source can be from any type of energy source, e.g., UV light emitting diode (LED), electron beam, light emitting diode (LED) lamp, mercury vapor lamp (H type), mercury vapor lamp with iron (D type), Mercury vapor lamp with gallium additive (V type), fluorescent lamp, or other energy source, combinations of the same and the like.

Optionally and/or alternatively, the cured material may be placed in an autoclave or annealing furnace to further cure the material, if necessary. This step can be repeated and can be done with or without an optional cooling step. It is believed this optionally heating and cooling step provided for a more consistent part to part product by curing the material, e.g., composite at same amount.

In one embodiment, the energy curable composition can be cured without UVB radiation and UVC radiation. In a preferred embodiment, the wavelength is from 385 nm to 405 nm and a more preferred embodiment the wavelength is about 390 nm. Low radiant flux means an energy measured at the surface of the material to be cured of less than about 500 mW/cm$^2$.

In one embodiment, the VOC free energy curable material has zero VOCs. The material cures rapidly to form a glassy high modulus optically clear material for example, the material may cure in two minutes or less with a low energy source or high energy source, e.g., greater than 100 W/cm$^2$ output energy. In a preferred embodiment, the material cures in one-hundred twenty seconds or less. The cured material is excellent for use in protective coatings, optical and outdoor applications and is non-yellowing when cured and has low oxygen inhibition.

In one embodiment, VOC free means a coating or coating composition that excludes organic chemicals, contains no organic chemicals, or has zero organic chemicals that have a high vapor pressure at ordinary room temperature. A high vapor pressure is a vapor pressure that results from a low boiling point, which causes large numbers of molecules to evaporate or sublimate from the liquid or solid form of the compound and enter the surrounding air, a trait known as volatility. For example, formaldehyde, which evaporates from paint, has a boiling point of only −19° C. (−2° F.).

In a preferred embodiment, the composition can be low radiant flux that means the energy at the surface of the material to be cured is less than 500 mW/cm$^2$, in a more preferred embodiment, the energy at the surface of the material to be cured is less than 400 mW/cm$^2$, in a more preferred embodiment, the energy at the surface of the material to be cured is less than 300 mW/cm$^2$, in a more preferred embodiment, the energy at the surface of the material to be cured is less than 200 mW/cm$^2$, in a more preferred embodiment the energy at the surface of the material to be cured is less than 100 mW/cm$^2$, and in a most preferred embodiment, the energy at the surface of the material to be cured is less than 40 mW/cm$^2$. In another embodiment, the energy at the surface of the material to be cured is 20 mW/cm$^2$, 19 mW/cm$^2$, 18 mW/cm$^2$, 17 mW/cm$^2$, 16 mW/cm$^2$, 15 mW/cm$^2$, 14 mW/cm$^2$, 13 mW/cm$^2$, 12 mW/cm$^2$, 11 mW/cm$^2$, 10 mW/cm$^2$, 9 mW/cm$^2$, 8 mW/cm$^2$, 7 mW/cm$^2$, 6 mW/cm$^2$, 5 mW/cm$^2$, 4 mW/cm$^2$, 3 mW/cm$^2$, 2 mW/cm$^2$, or 1 mW/cm$^2$.

In preferred embodiment, the radiation energy used to cure the composition has a wavelength in range from about 355 nm to about 420 nm. The material can be cured without UVB radiation and UVC radiation. In a preferred embodiment, the wavelength is in a range from 385 nm to 405 nm. The energy composition can be rapidly cured at a time of about 120 seconds or less with an output energy of less than 500 mW/cm$^2$ to form a tack free coating in an oxygen atmosphere.

In one embodiment, the energy source can be adjusted or controlled such that the radiant flux at the surface of the material to be cured is variable, e.g., linearly ramped from high to low or vice versa, non-linearly ramped or a combination of linearly ramping and non-linear ramping from about 0 mW/cm$^2$ to about 500 mW/cm$^2$ or greater over a specified time.

Optionally and/or alternatively, the radiant flux may be intermittent by pulsing the energy source such that the energy at surface is on and off for predetermined time intervals. The predetermined time internals may be from 1 nanosecond to 5 seconds or more. This may be able to aid the curing of energy curable composition as the curing process is a photochemical exothermic process. When using a temperature sensitive substrate one may want to minimize the temperature on the substrate caused by the exothermic curing and in such case predetermined wait time internals and applied time internals of the radiation can be configured to minimize temperature caused by the exothermic curing. In one embodiment, when using a low radiant flux energy exposure activates the photoinitiator, causing polymerization to occur in embodiments where polymerizable monomers are present. The compositions rapidly cure in the presence of oxygen in ambient conditions to a tack free coating.

In one embodiment, acrylate monomers and oligomers also called vinyl, ethylinically unsaturated, or ene groups. Acrylates are a sub class of these materials. Methacrylates are very similar to acrylates with a slightly different chemical structure. The two are often used interchangeably and commonly the term acrylate is defined to mean acrylate or methacrylate. In the formulations acrylates. Methacrylates can also be used. Monomers and oligomers are similar, typically defined by molecular weight or repeat structures for oligomers, e.g., oligomers are made up of repeating structures of monomers. Each of the acrylate monomers/oligomers can have complex functional groups with high molecular weights. The acylates may also include acrylamides and other vinyl groups can also be used.

In one embodiment and optionally and/or alternatively, the acrylate monomer be a acrylate-terminated compounds may be used having acrylate groups (i.e., unsaturated sites of carbon carbon double bonds) present at one or more, or all, of the terminal ends of the compound. The acrylate-terminated compound has greater than two unsaturated sites. In certain embodiments, the acrylate-terminated compound has greater than three unsaturated sites. In other embodiments, the acrylate-terminated compound has four or more unsaturated sites.

In one embodiment, non-limiting examples of acrylate monomers and oligomers may include one or more of epoxy acrylate, urethane acrylate, multifunctional acrylate, ethylene glycol di(meth) acrylate; triethylene glycol diacrylate; triethylene glycol dimethacrylate; tetraethyleneglycol dimethacrylate; tetraethylene glycol diacrylate; poly(ethylene glycol) dimethacrylates; the condensation product of bisphenol A and glycidyl methacrylate; 2,2'-bis [4-(3-methacryloxy-2-hydroxypropoxy)-phenyl]propane; hexanediol diacrylate; hexanediol dimethacrylate; ethoxylated hexanediol diacrylate; tripropylene glycol dimethacrylate; polyethylene glycol 400 diacrylate; butanediol di(meth) acrylate; neopentyl glycol di(meth) acrylate; hydroxyl pivalic acid neopentyl glycol diacrylate; glycerine triacrylate; diethylene glycol dimethacrylate; diethylene glycol diacrylate; dipropylene glycol dimethacrylate; dipropylene glycol diacrylate; pentaerythritol tetraacrylate; pentaerythritol ethoxylated (5) tetraacrylate; ditrimethylolpropane tetraacrylate; trimethylolpropane triacrylate; ethoxylated (3) trimethylolpropane triacrylate; tricyclodecane dimethanol diacrylate; tris(2-hydroxy ethyl) isocyanurate triacrylate; and combinations thereof.

In a preferred embodiment, the acrylate monomers and oligomers may include one or more of tripropylene glycol diacrylate; triethylene glycol diacrylate; neopentylglycol diacrylate; hexanediol diacrylate; trimethylolpropane triacrylate; ethoxylated (3) trimethylolpropane triacrylate; tricyclodecane dimethanol diacrylate; tris(2-hydroxy ethyl) isocyanurate triacrylate; and combinations thereof.

In one embodiment, the thiol monomers/oligomers may include one or more of, mercaptan, ethylene glycol bis (thioglycolate); ethylene glycol bis(3-mercaptopropionate); pentaerythritol tetra(3-mercaptopropionate); trimethylolpropane tris(3-mercaptopropionate); pentaerythritol tetra(2-mercaptoacetate); trimethylolpropane tris(2-mercaptoacetate); 1,6-hexanedithiol, 1,2-benzenedithiol, 1,3-benzenedithiol, isophorone diurethane thiol, and combinations thereof. In a preferred embodiment, the thiol monomer/oligomers includes one or more of pentaerythritol tetra(3-mercaptopropionate); and pentaerythritol tetra(2-mercaptoacetate).

In one embodiment, the photoinitiator may include any type of photo initiators that are capable of generating free radicals when exposed to visible light, UVA radiation, UVB radiation, UVC radiation and combinations of the same. In a preferred embodiment, the photoinitiator is bisacyl phosphine oxides. In addition, the photoinitiator may include one or more of 2,2-dimethoxy-1,2-diphenylethan-1-one; bis(2,4,6-trimethylbenzoyl)-phenylphosphineoxide (BAPO/Irgacure 819); 1-hydroxycyclohexyl benzophenone; 2,4,6-trimethyl-benzoyl-diphenyl-phosphine-oxide (TPO); 2-hydroxy-2-methyl-1-phenyl-propan-1-one (Irgacure 1173); ethyl(2,4,6-trimethylbenzoyl)-phenyl phosphinate (TPO-L); 1-hydroxycyclohexyl phenyl ketone (Irgacure 184); camphorquinone 2-benzyl-2-(dimethylamino)-4'-morpholinobutyrophenone; 1-hydroxycyclohexyl-phenyl ketone; 2-methyl-1-[4-(methylthio)phenyl]-2-morpholinopropan-1-one; 4-hydroxyl benzophenone laurate; 4-methyl benzophenone; 4-phenyl benzophenone; 1-[4-(2-hydroxyethoxyl)-phenyl]-2-hydroxy-2-methylpropanone; 2-hydroxy-2-methyl-1-phenylpropanone; bis(cyclopentadienyl) bis[2,6-difluoro-3-(1-pyrryl)phenyl titanium]; 2,2-dimethoxy-2-phenylacetophenone; 4-(4methylphenylthio) benzophenone; benzophenone; 2,4-diethylthioxanthone; 2-dimethylamino-ethylbenzoate; ethyl-4-(dimethylamino) benzoate; 2-ethylhexyl-4-dimethylaminobenzoate; 4'bis(diethylamino)benzophenone; isoamyl-4-(dimethylamino)benzoate; 2-isopropyl thioxanthone (ITX); methylbenzoylformate; methyl-0-benzoylbenzoate; 4-phenyl benzophenone; 2-(2-chlorophenyl)-1-[2-(2-chlorophenyl)-4,5-diphenyl-2H-imidazol-2-yl]-4,5-diphenyl-1H-imidazole; 4,4',4"-Methanetriyltris(N,N-dimethylaniline); benzoic acid, 4-(dimethylamino)-, 1,1'-[(methylimino)di-2,1-ethanediyl]ester; 2-hydroxy-1-[4-[4-(2-hydroxy-2-methylpropanoyl)phenoxy]phenyl]-2-methylpropan-1-one; Oligo[2-hydroxy-2-methyl-1-[4-(1-methylvinyl)phenyl] propanone]; 2-Hydroxy-2-methylpropiophenone; 2,4,6 trimethylbenzophenone and 4-methylbenzophenone; 2-hydroxy-2-methyl-1-phenyl-propan-1-one (Irgacure 1173); 2-hydroxy-1-(4-(4-(2-hydroxy-2-methylpropionyl)benzyl) phenyl)-2-methylpropan-1-one (Irgacure 127); bis(2,4,6-trimethylbenzoyl)-phenylphosphineoxide/2-hydroxy-2-methyl-1-phenyl-propan-1-one (Irgacure 2022); bis(2,4,6-trimethylbenzoyl)-phenylphosphine oxide (Irgacure 2100); 1-[4-(2-hydroxyethoxy)-phenyl]-2-hydroxy-2-methyl-1-propane-1-one (Irgacure 2959); 2-benzyl-2-dimethylamino-4'-morpholinobutyrophenone (Irgacure 369); 2-dimethylamino-2-(4-methyl-benzyl)-1-(4-morpholin-4-yl-phenyl)-butan-1-one (Irgacure 379); diphenyl(2,4,6-trimethylbenzoyl)-phosphine oxide/2-hydroxy-2-methyl-1-phenyl-propan-1-one (Irgacure 4265); 2,2-dimethoxy-1,2-diphenylethan-1-one (Irgacure 651); oxy-phenyl-acetic acid 2-[2-oxo-2-phenyl-acetoxy-ethoxy]-ethyl ester/oxy-phenyl-acetic acid 2-[2-hydroxy-ethoxy]-et (Irgacure 754); 2-methyl-1[4-(methylthio)phenyl]-2-morpholinopropan-1-one (Irgacure 907); 2,4,6-trimethylbenzoyldiphenylphosphine oxide (Irgacure 8953X); and combinations thereof. One or more of the foregoing photo initiators may require a co-photoinitiator as known in the art.

In a preferred embodiment, the photoinitiator includes one or more of bisacyl phosphine oxide; Diphenyl(2,4,6-trimethylbenzoyl) phosphine oxide; ethyl(2,4,6-trimethylbenzoyl)-phenyl phosphinate (TPO-L); and bis(2,4,6-trimethylbenzoyl)-phenylphosphineoxide (Irgacure 819/BAPO).

In one embodiment, the radical inhibitors may include one or more of N-nitrosophenylhydroxylamine; hydroquinone and derivatives; monomethyl ether hydroquinone; benzoquinone; methoxy hydroquinone; tert butyl catechol; phenothiazine; or pyrogallol. In one aspect, the inhibitors prevent the acrylate monomer photopolymerization from occurring before being activated by light. In a preferred embodiment, the radical inhibitors includes one or more of N-nitrosophenylhydroxylamine; pyrogallol; 1,4-benzenediol, 1,4-Dihydroxybenzene (HQ); 4-hydroxyanisole (MEHQ); N-nitorosophenylhydroxylamine aluminum salt (Q1301); and combinations thereof.

In one embodiment, the surface additives to reduce surface tension can include one or more silicone-containing surface additive that are solvent-free, solvent-borne and aqueous coating systems, printing inks and adhesive systems as well as ambient-curing plastic systems that have strong reduction of surface tension. Non-limiting examples of suitable surface additives include one or more silicone-containing surface additive or other non-silicone containing surface additives, e.g., polyacrylate-based additives. In one embodiment, the additives are solvent-free, solvent-borne and aqueous coating systems, printing inks and adhesive systems as well as ambient-curing plastic systems that have strong reduction of surface tension. In one embodiment, the surface additive is a crosslinking, silicone-containing surface additive. In one embodiment, the additive is non-toxic, e.g., it can be used for food contact applications and can include one or more surface additive from BYK, e.g., BYK-333; BYK-UV-3576; BYK-361 N; BYK-1794; BYK-1790; BYK-UV-3575; BYK-UV-3500, and BKUV-3575 and combinations of the same. Other In a non-preferred embodiment, the surface additive to reduce surface tension is a polyacrylate-based surface additive.

In one embodiment, one or more performance additives can include one or more of a UV protectant additive, abrasion resistance additive, adhesion promoter additive, algicide additive, antifoaming additives, antimarring additive, antirust additive, antiscratch resistance additive, antiskid additive, bactericides additive, corrosion inhibitor additive, flame retardant additive, flash rust inhibitor additive, flattening additive, fungicide additive, flow or leveling additive, fungicide additive, anti-weathering additive, matting flatting additive, surfactant additive, suspension additive, and thickening additive, as known in the art.

In one embodiment, the UV protectant additive is configured to prevent or minimize damage from the sun, e.g., Omnistab 1130 from IGM (CAS NO. 25322-68-3+104810-48-2+104810-47-1) and others as known in the art.

In one embodiment, the fire retardant additives may include one or more of phosphate methacrylate, ethylene glycol methacrylate phosphate, phosphoric acid 2-hydroxyethyl methacrylate, 2-hydroxyethyl methacrylate phosphate, 4-Hydroxybutyl Acrylate Phosphate, phosphate esters of hydroxyalkyl acrylates and hydroxyalkyl methacrylates, Miwon's Miramer SC1400 (proprietary phosphate methacrylate); Esstech Item #X-744-0000, HEMA Phosphate, Miwon's Miramer SC1400A (proprietary phosphate acrylate). In a preferred embodiment, these include Miramer SC1400 and Miramer SC1400A.

In one embodiment, the defoaming additives may include modified polydimethylsiloxanes, for example Dehydran 1293, 2293 as well as EFKA 2550, 2580, Foamstar A38, and MF324 offered by BASF, Drewplus S4374 by Ashland, Airex 901W, Foamex 805, and 822 by Theo Goldschmidt, Borchi Gol LA200 and Bochers AF0670 by OMG Borchers. Of course, other defoaming agents as known in the art may be utilized. The defoaming agents are capable of suppressing or making the foaming bubbles burst. In a preferred embodiment, defoaming agents are matched to the respective aqueous system and application.

In one embodiment, the solvents may include one or more of alcohol, methanol, ethanol, isopropanol (IPA), toluene tetrahydrofuran (THF), and dimethyl sulfoxide (DMSO). Acetone is not a suitable solvent and is thought to be incompatible with compositions described herein. Therefore, the composition is acetone free, without acetone or does not include an acetone component.

In one embodiment, the glass/silica fillers may include one or more of a silica particle; Kevlar veil; PET mesh; fiber mesh; metal mesh; Multi-Walled Carbon NanoTube (MWCNTs); carbon nanotubes (CNTs); organoclay; clays; alumina; titania; zirconia; carbon, bioglass (or bioactive glass); hydroxyapatite (HA) particle/mesh; quartz, barium glass; barium salt; titanium dioxide; and combinations thereof. In a preferred embodiment the glass/silica include fumed silica particle.

In one embodiment, the pigments may include one or more conventional pigments, such as titanium dioxide, iron oxides, zinc phosphate, zinc sulfide, zinc oxide, barium sulfate, magnesium silicate and corrosion inhibiting pigments, e.g., strontium chromate, zinc phosphate and barium metaborate, can be included. Optionally and/or alternately, the pigments may include a matting agent to adjust the sheen or gloss, e.g., matte finish, semi-gloss finish, gloss finish, satin finish, eggshell finish, and the like.

There are several methods of using the energy curable compositions, e.g., methods as described with reference to U.S. patent application Ser. No. 15/593,985, which is hereby incorporated by reference as if fully set forth herein. Each of the methods disclosed in U.S. patent application Ser. No. 15/593,985 are incorporated by reference as if fully set forth herein.

In one embodiment, various methods of using the energy curable materials described herein include using the energy curable material as decorative and/or protective coating on interior and exterior surfaces of: aircraft, automotive, recreational vehicles, watercraft, furniture and cabinetry, hardwood flooring, such as solid and engineered laminates, fishing tackle such as coating lures and baits, fiber reinforced fishing rods, fiber reinforced water sports equipment such as but not limited to: surfboards, wakeboards, bodyboards, water skis, skim boards, paddle boats, etc., fiber reinforced bath ware, spas, and hot tubs, fiber reinforced body panels for automotive, recreational vehicles, and watercraft.

In one embodiment, the energy curable material is used a laminating resin as described with reference to U.S. patent application Ser. No. 15/593,985, which is hereby incorporated by reference for that purpose. In one embodiment, the energy curable resin is used a filling agent or coating for the manufacture and repair of: fishing tackle such as coating lures, baits, fiber reinforced fishing rods, fiber reinforced water sports equipment such as but not limited to: surfboards, wakeboards, bodyboards, water skis, skim boards, paddle boats, etc., fiber reinforced bath ware, spas, pools, hot tubs, fiber reinforced body panels for automotive, recreational vehicles, watercraft, vehicle paneling such as those for recreational vehicle compartment walls, acoustic panels, aircraft interior cabinetry, fiber reinforced construction applications such as retention barriers for window wells, replications of construction facades such as decorative rock for building fronts, millwork, or ornamentations, structural chips, cracks, breaks, punctures or voids in composite matrix products, fiberglass, acrylic, glass, ceramic, porcelain, tile, natural, manmade stone, concrete, any solid material to add substance where material is lacking creating a new surface to provide for continuity, restoration, repair, etc. that is sandable, paintable, and can be tooled and conformed.

In one embodiment, the energy curable resin is used a general bonding material for two or more materials such as securing the windings over the guide to the rod on a fishing rod, securing windings on a fishing fly, securing electrical windings on motors, or any other process where the materials to be bonded are both covered and irradiated. The energy curable composition can also be used as an anti-tampering coating useful for indicating a break in safety protocols requiring the physical security of an object within a storage container or device.

In one embodiment, the energy curable resin herein has more than purpose, e.g., it can be used a topcoat, e.g., clear coating, a fire retardant coating, a water protective coating, a weather protective coating, an anti-corrosion protective coating, a sealant coating, e.g., cement sealer, wood sealer, a stain coating, an improved holdout coating combinations of the same and the like. In one embodiment, the cured coating is non-porous.

In one embodiment, the energy curable material can be added to a mold, e.g., transparent or non-transparent, to form a three-dimensional structure. The material can be cured as described herein and optionally heated and cooled. The energy curable material can be cured to a depth in a range from less than 1 mm to about 40 mm or less, in a preferred embodiment the cure depth is less than 1 mm. One embodiment of the invention is directed towards filing cracks in concrete or similar material and curing the material and curing the material in-situ.

Holdout means the ability of a coating to remain at or near the surface of a substrate, as opposed to penetrating that substrate. Better holdout results in the appearance of a smoother, more uniform coated surface with increased gloss and depth as compared to a coated substrate with less holdout. This is true even though the same dry film thickness of coating may have been applied to both substrates. For instance, in a porous substrate, when a coating is applied, the coating may absorb or permeate into the substrate. One embodiment of the invention is directed towards a method that reduces the amount of the coating absorbed into the substrate, allowing more of the coating to remain at or near the surface of the substrate. By increasing holdout in this manner, the resulting substrate has a smoother overall surface, and the substrate requires a fewer number of coatings. By reducing the number of required coatings, the invention also provides the advantages of reducing labor and material costs, while maintaining a coating with desirable properties. Moreover, increased or improved holdout means decreased fiber raising and increased moisture resistance. It is believed, the substrate will require a fewer number of coatings to achieve a desired finish. It is also believed the invention will lead to reduced processing time and reduced labor and material costs. Moreover, it is believed the invention provides a way to size a three-dimensional substrate. It is further believed the substrate produced by the process of the invention will typically display an increased stiffness, strength, smoothness and/or weight. It is further believed the invention can produce a sized or pretreated board that is compatible with a variety of overcoats. In one embodiment, the invention is directed towards man-made fiber boards, such as low density, medium density and high density fiber boards, for example.

Tack free is the ability of a coating to not be sticky on the surface as opposed to coating that it is sticky on a surface. Tack free time is equal to or less than the curing time and means the applied coating is no longer sticky to the touch.

One embodiment is directed towards a method of resurfacing or coating a material or substrate. The material or substrate may be a preexisting material including one or more of cement, wood, plater, plastic, fiberglass, thermoplastics, and combinations of the same. For example, the material may be worn or used swimming pool surface including at least one or more of chips, cracks, mold, algae, and combinations of the same. The resurfacing method includes cleaning and drying the cement surface. The method includes applying the energy curable material to the material or substrate by any conventional technique, e.g., spray, paint brush, roller, combinations of the same or the like, to a predetermined thickness. In a preferred embodiment, the thickness of the wet coating is in a range from about 2 mils to about 5 mils. Next, an energy source as described herein, e.g., having wavelength in a range from about 360 nm to about 420 nm at a surface power output less than about 400 mW/cm$^2$ was applied to cure the material for about two minutes or less. Of course, other curing surface power densities higher or lower, curing times higher or lower and/or performance additives may also be utilized as described herein. These steps are repeated until the desired thickness is achieved. Optionally, and/or alternatively, the energy source may be dynamically adjusted as described herein, e.g., be pulsed, ramped non-linearly, ramped linearly or combination as described herein. Moreover, an additional heating and cooling step may be done to a cured coating or article in a furnace and cooler. The heating may be done a temperature of about 100 degrees to about 180 degrees Fahrenheit or higher and the cooler is done below room temperature to freezing or lower each for a predetermined amount of time, e.g., 30 mins to 2 hours greater.

One embodiment of the invention is directed towards filling cracks in a substrate, e.g., a cement substrate. The cracks can be prefilled with a packing material, e.g., fiberglass rope that is coated or uncoated to prefill the crack. The packing material may include any composite material as known in the art. If the packing material coated and/or saturated with the energy curable material it can cure to a solid material as with the remaining filled crack. The curing includes applying an energy source has described herein to cure the material. Next the crack is filled or partially with the energy curable material it is cured with an energy source described herein. This filling process and curing may be repeated. Optionally and/or alternatively, the surface can be leveled with a mechanical grinding techniques as known in the art, if required.

One embodiment is directed towards a method of using the energy curable material as a chemically resistant nonpermeable protective layer or coating. The chemically resistant coating may be resistant to acid of less than 0 pH, 1 pH, 2 pH, 3 pH, 4 pH, 5 pH and higher. In addition, it is believed the coating is also resistant to a higher alkalinity, e.g., 6 pH to about 14 pH. Therefore, the coating will withstand harsh and destructive elements, e.g., sea water, steam, non-diluted muriatic acid, and the like. The protective coating may be formed on the desired substrate or material by applying the energy curable material to the material or substrate by any conventional technique, e.g., dipping, encapsulation, spray, paint brush, roller, combinations of the same or the like, to predetermined thickness. In a preferred embodiment, the thickness of the wet coating is in a range from about 2 mils to about 5 mils. Next, an energy source as described herein is applied to cure the material. Optionally and/or alternatively, the energy source may be pulsed, ramped nonlinearly, ramped linearly or combination as described herein.

One embodiment is directed towards a method of manufacturing a premanufactured panel for an aerospace vehicle or application, e.g., decorative cabinets, walls, prefabricated panels and other materials. In this embodiment, a wood veneer is adhered to an aerospace substrate, e.g., honeycomb made of alloy, composite or combination of the same. The wood veneer may have one or more surfaces treated with a fire retardant. In one embodiment the veneer is not treated with a fire retardant as the energy curable material described herein. The adhesive may include adhesives as known in the art, e.g., 3M Hi-Strength 90 contact adhesive.

Optionally and/or alternatively, the veneer does not include a stain, but is a natural wood veneer, e.g., bird's eye maple. The method includes applying the energy curable material with a pigment, e.g., stain as a liquid or powder, to the desired tone, to one or more surfaces of the veneer. Optionally, the veneer may be entirely encapsulated with the energy curable material. The stain colors or darkens the appearance of the veneer. Next, an energy source is applied to the coating at a surface power density in range from about 3 mW/cm$^2$ to about 400 mW/cm$^2$ or greater to cure the applied material. Additional layers and curing is done until a desired thickness is reached.

Pigments can also create a translucent stain or toner and to create a specific finish appearance and pattern on stain-grade wood and solid colored substrates. The coating serves at least four simultaneous purposes including a stain, a fire-retardant, optionally an insulator, and a protective or a sealing coating in one process step, thereby, reducing processing steps and overall cost of forming the aircraft panel. The coating may be configured to any sheen gloss, semi-gloss, satin, flat, and egg shell. Optionally, the material in the initial coating, i.e., directly adjacent to the veneer, may be allowed to penetrate the veneer using a dwell time of 30 seconds to about 60 minutes or more in an uncured state prior to curing with energy source. This dwell time allows the material to penetrate into the veneer by absorbing into the body of the veneer, e.g., pores, cracks, micro-cracks. Optionally and/or alternatively, heat can be applied to the material during the dwell time step or before the coating step with a heat source, e.g., heat gun or other conventional heating source. The heat allows moisture or VOC material in the veneer to be released.

One embodiment is directed towards a method of manufacturing a composite structure, e.g., a frame, fabricated by initially forming a stack of composite material herein in predetermined shape or in a mold. The energy curable material is applied to the material to saturate the material and an energy source as described herein to cure the material.

Optionally and/or alternatively, the material may be further annealing in a furnace for a predetermined time and repeated.

In one embodiment, the composite material may include a semi-synthetic fiber, a cellulose fiber, a fiberglass fiber, a carbon fiber, synthetic fiber, a metallic fiber, a silicon carbide fiber, a mineral fiber, polymer fiber, a microfiber and combinations of the same.

One embodiment is directed towards forming an annular aircraft window frame including forming a stack of fibrous layer or composite material (described herein) impregnated or soaked with a VOC free low radiant flux UV material as described herein in an annular pattern. Forming an annular metal trim conforming with said annular pattern, trapping said trim in a lower transparent mold having a lower mold channel, trapping said stacked layers atop said trim in said lower transparent mold channel, and pressing an upper mold atop said stacked layers for compression applying the ultraviolent energy source in a range from about 360 nm to about 420 nm at a surface power density as described herein. Other energies as described herein may be utilized.

Optionally, and/or alternatively, the molds used in one or more embodiments may include a transparent mold with or without transparent vacuum bags for forming composites. The molds may include an integrated energy, e.g., embedded light emitting diodes, or any external energy source. The formed material may also be heated and/or cooled as described herein. Moreover, any composite part, coating or repaired may performed with the energy curable material described herein with the process as described with reference to U.S. patent application Ser. No. 15/593,985, which is hereby incorporated by reference for those purposes.

One embodiment is directed towards manufacturing a bathware by replacing the porcelain over steel bathware or glazed bathware with the energy curable material as described herein. The material is cured with an energy source as described herein. As discussed herein several layers with or without composite materials may be built up and cured. Optionally and/or alternatively, the bath ware may be created with one or more a mold, mold injection using the energy curable material. The pigments and additional decorative components may be used.

One embodiment is directed towards bonding of two or more materials, e.g., securing the windings over the guide to the rod on a fishing rod, securing windings on a fishing fly, securing electrical windings on motors, or any other process where the materials are desired to be bonded. In this embodiment, the materials to be bonded are coated or covered with the energy curable material. Next, energy from an energy source as described herein is applied to cure the material. These steps can be repeated until can be repeated until the desired thickness is achieved. The applied material is done with a sufficient quantity to cover the materials to be bonded, however, when bonding delicate materials, only small amounts of the energy curable material is required to secure them together until either a thicker layer or multiple layers are applied in a buildup process.

In a preferred embodiment, surface preparation of any surface being treated with the energy curable is done to ensure the surfaces of the materials to be bonded are clean (free of waxes, greases, oils or other contaminants) and dried. Optionally and/or alternatively, the surface preparation includes roughening the surface, e.g., with sandpaper or other mechanical mechanisms, file, grinder, and the like, to provide a roughened attachment point to allow for enhanced adhesion of the cured material.

One embodiment is directed towards an insulator coating for electrical applications. The energy curable is used to cover wires, e.g., bare wires, or other electrical components to any thickness as described herein by applying the material to a desired thickness, curing the material with an energy source as described herein. The cured material is an electrical insulator.

In one embodiment, an anti-tampering coating or junction is formed. This method may be useful for indicating a break in safety protocols requiring the physical security of an object within a storage container or device. The energy curable material is used to cover or create anti-tampering junction to any thickness as described herein by applying the material to a desired thickness, curing the material with an energy source described herein and repeating, if necessary. The cured material is now an anti-tampering junction, so one would know if the junction is open or broken. Of course, pigments and other additives may be included as described herein.

In one embodiment, the energy curable composition is configured as a clear sprayable formulation configures as a low viscosity formulation that can be sprayed onto a substrate with a conventional sprayer. Table 1 shows both a premium energy curable composition and an economy energy curable composition. The premium version would be expected to exhibit higher modulus than the economy version due to the use of SR368D. The economy version is less expensive due to the use of increased amounts of TPGDA and no SR368D. Each of the versions can be adjusted with one or more of a surface additive to reduce surface tension as described herein, e.g., 0-10% by weight of total composition, one or more performance additives as described herein, e.g., 0-20% by weight of total composition, a glass/silica fillers as described herein and optional pigments. Optionally and/or alternately, the pigments may include a matting agent to adjust the sheen or gloss, e.g., matte finish, semi-gloss finish, gloss finish, satin finish, egg shell finish and the like.

One embodiment, is directed towards energy curable material be applied to any material, e.g., composite material, to pre-impregnated. For example, a pre-impregnated composite material in the form a pre-impregnated sheets or rolls may be packed in a non-UV energy transparent material as a prepackage for future use. To use a user removes the pre-impregnated materials and cures with an energy source described herein.

TABLE 1

Sprayable Energy Curable Composition.

| Premium Sprayable | | Economy Sprayable | |
|---|---|---|---|
| SR368D | 59.41% | TPGDA | 83.72% |
| PETMP | 19.80% | PETMP | 14.77% |
| TPO | 0.79% | TPO | 1.48% |
| HQ | 0.06% | Q1301 | 0.03% |
| MEHQ | 0.06% | | |
| TBC | 0.06% | | |

In one embodiment, the energy curable composition is a clearcoat composition as described Table 2. The composition of Table 2 can be adjusted with one or more of a surface additive to reduce surface tension as described herein, e.g., 0-10% by weight of total composition, one or more performance additives as described herein, e.g., 0-20% by weight of total composition, a glass/silica fillers as described herein and optional pigments. Optionally and/or alternately, the pigments may include a matting agent to adjust the sheen or gloss, e.g., matte finish, semi-gloss finish, gloss finish, satin finish, egg shell finish and the like. This composition can be cured with an energy source as described herein.

TABLE 2

| Clearcoat Energy Curable Composition. | |
|---|---|
| TPGDA | 24.72% |
| TMPEO3TA | 57.68% |
| PETMP | 14.54% |
| TPO-L | 2.91% |
| HQ | 0.05% |
| MEHQ | 0.05% |
| TBC | 0.05% |

In one embodiment, the energy curable composition is a clearcoat composition as described Table 3. The energy curable composition of Table 3 can be adjusted with one or more of a surface additive to reduce surface tension as described herein, e.g., 0-10% by weight of total composition, one or more performance additives as described herein, e.g., 0-20% by weight of total composition, a glass/silica fillers as described herein and optional pigments. Optionally and/or alternately, the pigments may include a matting agent to adjust the sheen or gloss, e.g., matte finish, semi-gloss finish, gloss finish, satin finish, eggshell finish and the like. This composition can be cured with an energy source as described herein.

TABLE 3

| Sprayable Energy Curable Composition. | |
|---|---|
| Photomer 6008 | 14.54% |
| TMPE03TA | 67.87% |
| PETMP | 14.54% |
| TPO-L | 2.91% |
| HQ | 0.05% |
| MEHQ | 0.05% |
| TBC | 0.05% |

In one embodiment, the energy curable composition of Table 4 is thicker formulation that would be used to laminate composite materials, e.g., for use in applications such as making bathtubs or to laminate a carbon fiber cloth for use in applications such as airplane composites. Optionally and/or alternatively, a Photomer 6008 can be used instead of PE210. The compositions in Table 4 can be adjusted with one or more of a surface additive to reduce surface tension as described herein, e.g., 0-10% by weight of total composition, one or more performance additives as described herein, e.g., 0-20% by weight of total composition, a glass/silica fillers as described herein and optional pigments. Optionally and/or alternately, the pigments may include a matting agent to adjust the sheen or gloss, e.g., matte finish, semi-gloss finish, gloss finish, satin finish, eggshell finish and the like. This composition can be cured with an energy source as described herein.

TABLE 4

| Laminating Energy Curable Composition. | |
|---|---|
| TPGDA | 46.05% |
| PETMP | 8.12% |
| TPO | 0.81% |

TABLE 4-continued

| Laminating Energy Curable Composition. | |
|---|---|
| Q1301 | 0.02% |
| PE210 (Bisphenol A epoxy acrylate) | 45% |

In one embodiment, the energy curable composition is a paste, e.g., knife grade paste, with compositions shown in Table 5 and Table 6. These formulations have been filled/compounded with silica particles to increase viscosity so that it has consistency of a paste and can be spread and shaped onto substrates with a "knife" blade. The premium version would be expected to exhibit higher modulus than the economy version due to the use of SR368D. The economy version is less expensive due to the use of increased amounts of TPGDA and no SR368D. The formulations in Tables 5 and 6 are clear.

TABLE 5

| Paste Energy Curable Compositions. | | | |
|---|---|---|---|
| Premium Paste | | Economy Paste | |
| SR368D | 68.57% | TPGDA | 77.61% |
| PETMP | 22.86% | PETMP | 13.69% |
| TPO | 1.00% | TPO | 1.37% |
| HQ | 0.10% | Q1301 | 0.03% |
| MEHQ | 0.10% | Aerosil 200 | 7.3% |
| TBC | 0.10% | | |
| Aerosil 200 | 7.28% | | |

TABLE 6

| Paste Energy Curable Composition. | |
|---|---|
| TMPEO3TA | 73.82% |
| PETMP | 13.03% |
| TPO-L | 2.61% |
| HQ | 0.04% |
| MEHQ | 0.04% |
| TBC | 0.04% |
| Aerosil 200 | 10.42% |

In one embodiment, the energy curable composition is a paste, e.g., knife grade paste has a color pigment added of titanium dioxide to make it a white paste. Any pigment can be added as described herein. The compositions are Table 7 and Table 8. These formulations have been filled/compounded with silica particles to increase viscosity so that it has consistency of a paste and can be spread and shaped onto substrates with a "knife" blade. The premium version would be expected to exhibit higher modulus than the economy version due to the use of SR368D. The economy version is less expensive due to the use of increased amounts of TPGDA and no SR368D. The formulations in Tables 5 and 6 are clear.

TABLE 7

| Pigmented Paste Energy Curable Composition. | | | |
|---|---|---|---|
| Premium Paste | | Economy Paste | |
| SR368D | 68.57% | TPGDA | 77.61% |
| PETMP | 22.86% | PETMP | 13.69% |
| TPO | 1.00% | TPO | 1.37% |

TABLE 7-continued

| Pigmented Paste Energy Curable Composition. | | | |
|---|---|---|---|
| Premium Paste | | Economy Paste | |
| HQ | 0.10% | Ql301 | 0.03% |
| MEEHQ | 0.10% | Aerosil 200 | 7.3% |
| TBC | 0.10% | White (TiO2) | 3% |
| Aerosil 200 | 7.28% | | |
| White (TiO2) | 3% | | |

TABLE 8

| Pigmented Paste Energy Curable Composition. | |
|---|---|
| TMPEO3TA | 73.82% |
| PETMP | 13.03% |
| TPO-L | 2.61% |
| HQ | 0.04% |
| MEHQ | 0.04% |
| TBC | 0.04% |
| Aerosil 200 | 10.42% |
| White | 2.54% |

In embodiments herein and in Tables 1-8 and Examples the chemical names are disclosed here in also some abbreviations are listed in Table 9 for convenience.

TABLE 9

Chemical Names.

| Product Name | Chemical Makeup | CAS Number | Type |
|---|---|---|---|
| SR368D | Mixture of tris (2-hydroxy ethyl) isocyanurate triacrylate and trimethylolpropane triacrylate | 15625-89-5 40220-08-4 | Acrylate monomer/ oligomer |
| TPGDA | Tripropyleneglycol diacrylate | 42978-66-5 | Acrylate monomer/ oligomer |
| TMPEO3TA | Ethoxylated (3) trimethylolpropane triacrylate | 28961-43-5 | Acrylate monomer/ oligomer |
| Photomer 6008 | aliphatic urethane triacrylate | Proprietary | Acrylate oligomer |
| PETMP | Pentaerythritol tetra(3-mercaptopropionate) | 7575-23-7 | Thiol monomer/ oligomer |
| TPO | Diphenyl(2,4,6-trimethylbenzoyl)phosphine oxide | 75980-60-8 | Photoinitiator |
| TPO-L | ethyl(2,4,6-trimethylbenzoyl)-phenyl phosphinate | 84434-11-7 | Photoinitiator |
| HQ | Hydroquinone | 123-31-9 | Radical inhibitor |
| MEHQ | 4-methoxyphenol | 150-76-5 | Radical inhibitor |
| TBC | 4-tert-butylcatechol | 98-29-3 | Radical inhibitor |
| Ql301 | Aluminum n-nitrosophenylhydroxylamine | 15305-07-4 | Radical inhibitor |
| IPA | Isopropanol | 67-63-0 | Solvent/diluent |

In embodiments herein and in Tables 1-8 and Examples the chemical names are disclosed here in also some abbreviations are listed in Table 9 for convenience.

Certain non-limiting examples of mixing the enhanced fire retardant formulation with the non-enhanced fire retardant energy curable formulation can be done in-situ, prior to applying on a substrate or a combination of the same at various mixing ratios. By way of example an in-situ application can include applying an enhanced fire retardant formulation at a first thickness and then applying a non-enhanced fire retardant VOC free energy curable composition, e.g., low radiant flux curable formulation, at a second thickness to a substrate followed by curing the mixture with the application of the radiation source. The order of apply non-enhanced fire retardant VOC free low radiant flux curable formulation and the enhanced fire retardant VOC free low radiant flux curable formulation can vary or multiple applications can be done prior to curing the radiation sources. The first and second thickness may a thickness in a range from 0.0001 inch to about 1 inch or more.

In another non-limiting embodiment, Part 1 and Part 2 are applied in-situ, mixed or a combination. In this embodiment, Part 1 is the enhanced fire retardant VOC free low radiant flux curable formulation and Part 2 is the non-enhanced fire retardant VOC free low radiant flux curable formulation. When applying or mixing the ratios may be any of the following: (1:1) Part 1=100%, Part 2=100%; (2:1) Part 1=100%, Part 2=50%; (3:1) Part 1=100%, Part 2=33%; (4:1) Part 1=100%, Part 2=25%; (5:1) Part 1=100%, Part 2=20%; (6:1) ratio; (7:1) ratio; (8:1) ratio; (9:1) ratio; and (10:1) ratio of course, other ratios or sub-ratios and combinations may also be utilized.

In yet another embodiment, a first layer of non-enhanced fire retardant VOC free low radiant flux curable formulation was applied and not cured and a second layer of enhanced fire retardant VOC free low radiant flux curable formulation was applied and the two layers were cured simultaneously or substantially simultaneously.

In still yet another embodiment, a first layer of enhanced fire retardant VOC free low radiant flux curable formulation was applied and cured and a second layer of non-enhanced fire retardant VOC free low radiant flux curable formulation was applied and cured.

dwell prior to curing for about thirty minutes

EXAMPLES

The following examples set forth preferred methods in accordance with the invention. It is to be understood, however, that these examples are provided by way of illustration and nothing therein should be taken as a limitation upon the overall scope of the invention.

Example 1

In this Example 1 an enhanced fire retardant VOC free low radiant flux radiation curable composition was utilized. The enhanced fire retardant composition coated veneer was compared to a non-enhanced VOC free low radiant flux radiation curable composition. More specifically, samples for flame testing were made by coating birch veneer purchased from Home Depot with the enhanced fire retardant composition.

The samples were sprayed using a badger gravity fed sprayer (the ones used for art) to a thickness of about 3-5 mils. The first coating as shown in Table 1 was allowed to dwell prior to curing for about thirty minutes, however, the other coats were simply applied and cured with little or no dwell time. Next, the samples were cured with an energy source by applying a radiation curing of about 2 minutes with an energy at a surface of the coating of about 5 $mW/cm^2$ or less with a UV LED energy source having a wavelength in a range from about 360 nm to about 420 nm.

After the first coat, the samples were sanded and two additional layers of the control formulation sprayed and cured without sanding. Each sample was placed flat about ¾ inch from the tip of a candle flame and held there until it caught fire or for up to 3 minutes if it did not catch fire. Table 1 contains coating information and Table 2 contains the flame results. Table 3 contains pictures of each specimen and burn diameters.

Formulation A, which is a non-enhanced VOC free low radiant flux radiation curable composition used in this Example as part of the control. Was made as follows:

1. Weigh out inhibitors, HQ, MEHQ, TBC, and photo initiator, TPO
2. Add $TMPEO_3TA$ and TPGDA
3. Mix until solids are dissolved

| Compound | CAS # | Supplier | Wt. Percent |
|---|---|---|---|
| TMPEO3TA | 28961-66-5 | IGM | 25.5% |
| TPGDA | 42978-66 | IGM | 59.5% |
| TPO | 75980-60-5 | IGM | 3% |
| HQ | 123-31-9 | Aldrich | 0.05% |
| MEHQ | 150-76c5 | Aldrich | 0.05% |
| TBC | 98-29-3 | Aldrich | 0.05% |

4. Add PETMP and cover with foil

| Compound | CAS # | Supplier | Wt. Percent |
|---|---|---|---|
| PETMP | 7575-23-7 | Evens Chemical | 15% |

5. Mix until miscible
6. Optionally Record viscosity

Formulation B—Enhanced Fire-Retardant Formulation [FR]

Formulation B—Enhanced Fire-retardant Formulation [FR] was made by adding the fire retardant component as a performance additive as follows:

1. Weigh out inhibitors, HQ, MEHQ, TBC, and photo initiator, TPO-L
2. Add $TMPEO_3TA$

| Compound | CAS# | Wt. Percent |
|---|---|---|
| TPGDA | 42978-66 | 47.2% |
| TPO-L | 75980-60-5 | 5.6% |
| SC1400A | Prop | 47.2% |

3. Cover and mix until all solids are miscible

The substrates were coated as shown in Table 10 and tested as shown in Table 11.

TABLE 10

Coatings for Flame Testing.

| | Control | FR |
|---|---|---|
| Coat 1 | Formulation A-Non-enhanced FR Dwell time of about 30 minutes prior to curing | Formulation B-Enhanced FR Dwell time of about 30 minutes prior to curing |
| Coat 2 | Formulation A-Non-enhanced FR | Formulation A-Non-enhanced FR |
| Coat 3 | Formulation A-Non-enhanced FR | Formulation A-Non-enhanced FR |

The cured coating was tested as described herein as shown in Table 12.

TABLE 11

Flame Testing Results-Time to Ignition. Samples tested for >3 minutes did not catch fire.

| Run | Control | FR |
|---|---|---|
| Sample 1 | 40 s | >3 min |
| Sample 2 | >3 min | >3 min |
| Sample 3 | 30 s | >3 min |
| Sample 4 | 40 s | 80 s |
| Sample 5 | 50 s | >3 min |

The results of the testing of Table 12 were measured to obtain an approximate burn diameter as shown in Table 13.

TABLE 12

Flame Testing Results.

| | Burn Diameter |
|---|---|
| Sample 1-Control | 1.4 cm |
| Sample 2-Control | 1.8 cm |
| Sample 3-Control | 1.5 cm |
| Sample 4-Control | 1.8 cm |
| Sample 5-Control | 1.5 cm |
| Sample 1-FR | 4.5 cm |
| Sample 2-FR | 3.8 cm |
| Sample 3-FR | 3.7 cm |
| Sample 4-FR | 2.5 cm |
| Sample 5-FR | 3.4 cm |

Example 2

This Example 2 is directed towards comparing a VOC free low radiant flux radiation curable composition without a surface additive ("Formulation A") to reduce surface tension to one with a surface additive to reduce surface tension ("Formulation C") configured to be utilized on substrates that have impurities, e.g., oils, contaminants, other contaminates, in order to create smooth appearance without the need for further polishing or minimal buffing.

Formulation C was made as follows:

1. Weigh out inhibitors, HQ, MEHQ, TBC, and Photo Initiator, TPO-L
2. Add TMPEO3TA and TPGDA and BYK-333
3. Mix until solids are dissolved

| Compound | CAS # | Wt. Percent |
|---|---|---|
| $TMPEO_3TA$ | 28961-66-5 | 25.5% |
| TPGDA | 42978-66 | 59.5% |
| TPO-L | 75980-60-5 | 3% |
| BYK-333 | Prop | 0.3% |
| HQ | 123-31-9 | 0.05% |
| MEHQ | 150-76-5 | 0.05% |
| TBC | 98-29-3 | 0.05% |

4. Add PETMP and cover with foil

| Compound | CAS # | Wt. Percent |
|---|---|---|
| PETMP | 7575-23-7 | 15% |

5. Mix until miscible
6. Optionally Record viscosity

In Example 2, the formulation was made by two raw untreated veneer substrates were coated with a conventional wood stain on surface. The stain was a conventional wood stain that included volatile organic compounds and other contaminants configured with a fire retardant. These stained veneers were allowed to air dry for sixty minutes. Next both stained veneers were bonded to a larger base substrate by applying a 3M™ Hi-Strength 90 Spray Adhesive to the larger base substrate and an unstained surface of each veneer. FIG. 1 illustrates Example 2 having veneer A and veneer B attached to a substrate. Referring to FIG. 1, a stained veneer A 102 and stained veneer B 104 were attached to a substrate 106 prior to coating with an adhesive as described herein.

Next, at about 82 degree in the spray booth, Formulation A was applied to a first veneer, veneer A 102 and Formulation C was applied to a second veneer, veneer B 104 to a thickness of about 2 mils to about 5 mils. Each of the formulations were applied with a HVLP Jaguar SPP gravity feed sprayer. The applied coatings were allowed to dwell for about 5 minutes prior to applying a radiation curing of about 2 minutes at an energy at a surface of the coating of about 5 $mW/cm^2$ or less with a UV LED energy source having a wavelength in a range from about 360 nm to about 420 nm. Next, the surface was sanded with a 320 grit pad with an electric orbital sander disc for about 1 minute or less to remove any glossy features and the process was repeated five additional times.

Figure 2:
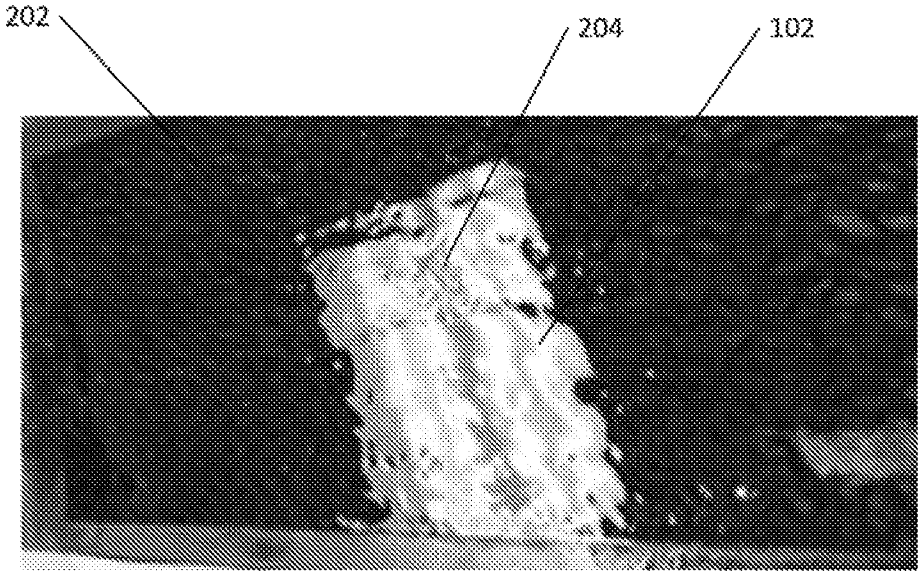
FIG. 2 illustrates veneer A with a cured coating according to an example of the invention.
Figure 3:
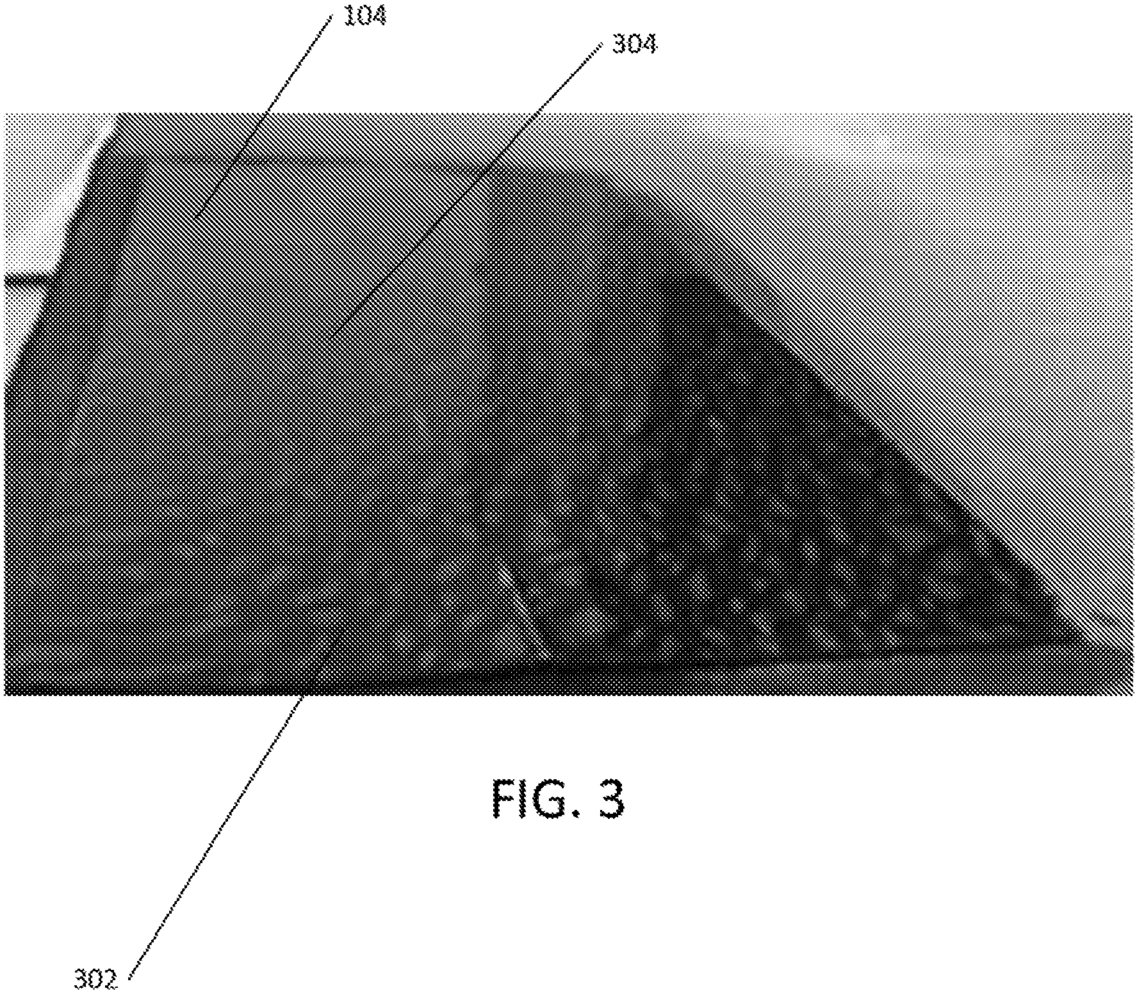
FIG. 3 illustrates veneer B with a cured coating according to an example of the present disclosure.

FIG. 2 illustrates veneer A with a cured coating. FIG. 3 illustrates veneer B with a cured coating.

Referring to FIG. 2, illustrating veneer A 102 with a cured coating 202 to it was observed in this process that the Veneer A with a cured coating 202 coating had imperfections 204 including one or more of bumps, air bubbles, fish eyes and combinations of the same after each cured coating. As more layers were built up and cured the imperfections 204 were decreased, but still present. Also, with a final polish and sanding was required to remove the imperfections. At least some of these imperfections 204 are believed to be due to the impurities in the stain that was used, e.g., VOCs and other contaminants. Now referring to FIG. 3, showing veneer B 104 the cured coating 302 included much less or no imperfections and included a glassy finish 304. In addition, the final coating would require no or minimal polishing thereby saving labor costs and material, i.e., material that would have to be removed. The final coated and cured products are shown in FIG. 2 (Veneer A) and FIG. 3 (Veneer B). Again, comparing the products of FIGS. 2 and 3 it shows more work would be required to achieve a desired finish with FIG. 2 vs. FIG. 3. That is, FIG. 2 shows significant number of imperfections 204 remaining after curing while FIG. 3 shows none.

Example 3

Example 3 illustrates other formulations of a VOC free low radiant flux radiation curable composition used having a matte finish. Was made as follows:

1. Weigh out inhibitors, HQ, MEHQ, TBC, and Pl, TPO
2. Add $TMPEO_3TA$ and TPGDA
3. Mix until solids are dissolved

| Compound | CAS # | Wt. Percent |
|---|---|---|
| TMPEO3TA | 28961-66-5 | 25.5% |
| TPGDA | 42978-66 | 59.5% |
| TPO | 75980-60-5 | 3% |
| HQ | 123-31-9 | 0.05% |
| MEHQ | 150-76c5 | 0.05% |
| TBC | 98-29-3 | 0.05% |

4. Add PETMP and cover with foil

| Compound | CAS # | Wt. Percent |
|---|---|---|
| PETMP | 7575-23-7 | 15% |

5. Mix until miscible
6. Optionally Record viscosity
7. Carefully pour formulation for steps 1-5 over a powder.

| Compound | CAS # | Wt. Percent |
|---|---|---|
| Acematt 3600 | | 7.4% |
| Formulation from steps 1-5 | | 192.6 |

8. Cover and begin mixing. Slowly ramp speed until all powder is incorporated. Mix until all components are miscible.
9. Bottle

Example 4

Example 4 illustrates other formulations of a VOC free low radiant flux radiation curable composition used having a high viscosity as a knife grade paste. Was made by mixing the following:

1. Weigh out inhibitors, HQ, MEHQ., TBC, and photo initiator, TPO
2. Add TMPEO3TA and TPGDA
3. Mix until solids are dissolved

| Compound | CAS # | Wt. Percent |
|---|---|---|
| $TMPEO_3TA$ | 28961-66-5 | 81.6% |
| TPO | 75980-60-5 | 2.88% |
| HQ | 123-31-9 | 0.05% |

-continued

| Compound | CAS # | Wt. Percent |
|---|---|---|
| MEHQ | 150-76c5 | 0.05% |
| TBC | 98-29-3 | 0.05% |

4. Add PETMP and cover with foil

| Compound | CAS # | Supplier | Wt. Percent |
|---|---|---|---|
| PETMP | 7575-23-7 | Evens Chemical | 14.4% |

5. Mix until miscible
6. Optionally add sheening agent of Acematt 3600 and mix until miscible for a matte finish.

| Compound | CAS # | Supplier | Wt. Percent |
|---|---|---|---|
| Acematt 3600 | | Evonik | 4% |

Example 5

Example 5 illustrates other formulations of a VOC free low radiant flux radiation curable composition used as a laminating resin. Was made as follows:

1. Weigh out inhibitors, HQ, MEHQ, TBC, and photo initiator, TPO
2. Add $TMPEO_3TA$

| Compound | CAS # | Wt. Percent |
|---|---|---|
| TMPEO3 TA | 28961-66-5 | 70% |
| TPO-L | 75980-60-5 | 3% |
| HQ | 123-31-9 | 0.05% |
| MEHQ | 150-76c5 | 0.05% |
| TBC | 98-29-3 | 0.05% |

3. Cover and mix until all solids are dissolved
4. Add Photomer 6008.

| Compound | CAS # | Wt. Percent |
|---|---|---|
| Photomer 6008 | Prop | 15% |

5. Cover and mix until all components are miscible
6. Add PETMP and cover with foil.

| Compound | CAS # | Wt. Percent |
|---|---|---|
| PETMP | 7575-23-7 | 15% |

7. Cover and mix until all components are miscible

Example 6

Example 6 illustrates other energy curable compositions and energy and times to cure to a tack free coating. In this example, three formulations were made including Formulation 6A, 6B and 6C were made.

Formulation 6A was made as follows:

1. Weigh out inhibitors, HQ, MEHQ, TBC, and photo initiator, TPO
2. Add $TMPEO_3TA$ and TPDGDA
3. Mix until solids are dissolved

| Compound | CAS # | Wt. Percent |
|---|---|---|
| $TMPEO_3TA$ | 28961-66-5 | 25.5% |
| TPGDA | 42978-66 | 59.5% |
| TPO | 75980-60-5 | 3% |
| HQ | 123-31-9 | 0.05% |
| MEHQ | 150-76-5 | 0.05% |
| TBC | 98-29-3 | 0.05% |

4. Add PETMP and cover with foil

| Compound | CAS # | Wt. Percent |
|---|---|---|
| PETMP | 7575-23-7 | 15% |

5. Mix until miscible
6. Record viscosity

Formulation 6B was made as follows:

1. Weigh out inhibitors, HQ, MEHQ, TBC, and photo initiator, TPO
2. Add $TMPEO_3TA$
3. Mix until solids are dissolved

| Compound | CAS # | Wt. Percent |
|---|---|---|
| $TMPEO_3TA$ | 28961-66-5 | 85.5% |
| TPO-L | 75980-60-5 | 2% |
| HQ | 123-31-9 | 0.05% |
| MEHQ | 150-76-5 | 0.05% |
| TBC | 98-29-3 | 0.05% |

4. Add PETMP and cover with foil
5. Mix until

| Compound | CAS # | Wt. Percent |
|---|---|---|
| PETMP | 7575-23-7 | 15% |

6. Measure out 70 grams of material into a speedmixer cup
7. Add 2.1 g amount of "Aerosil 200 add 1". Mix on 10-13 rpm
8. Add 2.1 g amount of "Aerosil 200 add 2". Mix on 13-16 rpm
9. Add 2.1 g amount of "Aerosil 200 add 3". Mix on 20-25 rpm
10. Add 2.1 g amount of "Aerosil 200 add 4". Mix on 25-36 rpm
11. Allow to cool to room temperature
12. Mix a final time at max speed
13. Add 26 g of paste to a 20 cc syringe Formulation 6C was made as follows:

1. Weigh out inhibitors, HQ, MEHQ, TBC, and photo initiator, TPO
2. Add $TMPEO_3TA$

| Compound | CAS # | Wt. Percent |
|---|---|---|
| $TMPEO_3TA$ | 28961-66-5 | 70% |
| TPO-L | 75980-60-5 | 3% |
| HQ | 123-31-9 | 0.05% |

-continued

| Compound | CAS # | Wt. Percent |
|---|---|---|
| MEHQ | 150-76-5 | 0.05% |
| TBC | 98-29-3 | 0.05% |

3. Cover and mix until all solids are dissolved
4. Add Photomer 6008

| Compound | CAS # | Wt. Percent |
|---|---|---|
| Photomer 6008 | | 15% |

5. Cover and mix until all solids are dissolved
6. Add PETMP and cover with foil

| Compound | CAS # | Wt. Percent |
|---|---|---|
| PETMP | 7575-23-7 | 15% |

7. Cover and mix until all components are miscible.
8. Record viscosity

Each formulation 6A, 6B, and 6C were tested with results shown in Table 14 and drawn down on a glass microscope slide with an Accu Dyne #50 (127 μm) bar. The sample was irradiated under a 390-410 nm (Edison 150 watt) light at the designated intensity. The intensity was measured with an International Light Radiometer 1L1400 tack free was determined by pressing a fresh latex glove against the surface of the polymer with moderate pressure. If the polymer is marred in any way the surface is tacky. If no residue is observed on the glove and the surface is unmarred, then the surface is considered to be tack free.

TABLE 14

| Results | | | |
|---|---|---|---|
| Intensity ($mW/cm^2$) | Energy Curable Composition 6A- Cure Time (s) to tack free | Energy Curable Composition 6B- Cure Time(s) to tack free | Energy Curable Composition 6C- Cure Time (s) to tack free |
| 5 | 120 | 120 | 120 |
| 10 | 75 | 75 | 65 |
| 20 | 30 | 50 | 30 |
| 40 | 20 | 40 | 20 |

Example 7

This Example 7 illustrates creating an energy curable composition that is a clear sprayable formulation. The composition is VOC free and will cure tack free with non-yellowing upon application of UV light source with a sufficient energy for a sufficient time. In this example, the formulation was created by adding 100 grams of TMP(EO) 3TA was added to 8 grams of 1-Hydroxy-cyclohexyl-phenyl-ketone (Irgacure 184) in a container and mixed with an overhead stirrer for approximately 45 minutes or until all of the Irgacure 184 was dissolved. Dissolving the Irgacure 184 may be sped up by the application of heat to the container by placing the container on a hot plate at temperature of approximately 60° C. The made composition was 92.6 weight percent % $TMP(EO)_3TA$ and 7.4 weight percent % Irg 184.

The formulation was then applied to a substrate to a thickness of approximately 25 μm using a drawdown bar and irradiated with a 150 W Edison UV-LED (390-410 nm) light source for 1 minute. The light source even at the highest intensity (as close as possible to the light about 1 inch or less, >80 $mW/cm^2$ the composition did not fully cure after 1 minute of irradiation. That is, it did cure tack-free, but is soft, i.e. could be readily scratched with the application of a fingernail.

In addition, the same composition was applied to a substrate such as ABS and acrylic. A high intensity broadband UV mercury light from a Heraeus F300 with 300 Watt/inch H bulb having an intensity of ~500 $mW/cm^2$ was used to cure the coating on each substrate by passing the coating under the light using a conveyor system. The coating cured tack free and non-yellowing belt speeds of up to 80 feet per minute.

Example 9

This Example 9 illustrates creating a energy curable composition as a clear sprayable formulation. The composition is VOC free and will cure tack free with non-yellowing. In this example, the formulation was created by adding 100 grams of TPGDA was added to 8 grams of 1-Hydroxy-cyclohexyl-phenyl-ketone (Irgacure 184) in a container and mixed with an overhead stirrer for approximately 45 minutes or until all of the Irgacure 184 was dissolved. Dissolving the Irgacure 184 may be sped up by the application of heat to the container by placing the container on a hot plate at temperature of approximately 60° C. The made composition was 92.6% TPGDA, 7.4% Irg 184.

The composition was applied to a substrate of ABS and an acrylic substrate. A high intensity broadband UV mercury light from Heraeus F300 with 300 Watt/inch H bulb having an intensity of approximately 500 mW/cm2 was used to cure the coating on each substrate. The coating cured tack free and non-yellowing at belt speeds of up to 80 feet per minute.

Example 10

This Example 10 illustrates creating a UV Curable Composition as a clear sprayable formulation. The composition is VOC free and will cure tact free with non-yellowing. In this example, the formulation was created by adding 32 grams of bisphenol A epoxy diacrylate, 68 grams of TPGDA, and 8 grams of 1-Hydroxy-cyclohexyl-phenyl-ketone (Irgacure 184) in a container that was placed on a hot plate at 60° C. and mixed with an overhead stirrer for approximately 45 minutes or until all of the Irgacure 184 was dissolved. The made composition was 29.6% bisphenol A epoxy diacrylate, 63.0% TPGDA, 7.4% Irg 184.

The composition was applied to a substrate of ABS and an acrylic substrate. A high intensity broadband UV mercury light from Heraeus F300 with 300 Watt/inch H bulb having an intensity of approximately 500 mW/cm2 was used to cure the coating on each substrate. The coating cured tack free and non-yellowing up to belt speeds of 100 feet per minute.

Example 11

This Example 11 illustrates the manufacture of three separate test articles prepared for a Heat and Release test. The Heat and Release Test is described with referenced to 14 CFR Part 25.853 (d) Arndt 25-116 Appendix F Part IV, which is hereby incorporated by reference.

Each of the test articles were Kaiser Aluminum substrates at 5.9 inch by 5.9 inch aluminum substrates sheet that were 0.050 inches thick. Three test articles were used. The aluminum had a Lot No. 13141083. Each test article was prepared by uniformly roughening the surface with 80 grit sandpaper with a conventional orbital sander on one of the sides of each test article. After the sander the articles were blown with an air compressor to remove sanded particulates. Each of the substrates where cleaned with isopropyl alcohol (IPA) prior to coating.

In this Example 11, each of the test articles where coated with (1:1) mixture of Formulation B—Enhanced Fire-retardant Formulation [FR] and Formulation C as described herein to form the enhanced fire retardant VOC free low radiant flux radiation curable composition that was tested.

The spray cup was filled the enhanced fire retardant VOC free low radiant flux radiation curable composition and loaded into a conventional high-volume, low-pressure (HVLP) automotive spray gun with a 1.4 spray tip and 45 lbs of pressure at the spray cap. The spray gun was used at a distance of about six to twelve inches to form a medium wet coat of about 10 mils with about 2-3 mills per pass on each of the test articles. The wet coat was allowed to dwell or rest for about three minutes to level. Next, the surface was cured with a 1200 W low intensity UV light source having a wavelength in a range from about 360 nm to about 405 nm at a surface power density at 3 mW/cm$^2$ for about 120 seconds. After the curing the coated aluminum was completely cured and tack free. Tack free was tested by checking the cured coating.

This coating and curing step was repeated two additional times to form a cured coating having a thickness of about 20 mils to 25 mils. The total cure time for the coating was about 210 seconds. Each of the three coated veneer articles were tested by Skandia Laboratories under the Heat and Release Flame Test codified at 14 C.F.R. Part 25.853 (a) Amdt 25-116 Appendix F Part I (a)(1)(ii). The results of the test are shown in Table 15.

TABLE 15

Scandia Test Results for Heat and Release Test:

| Set Run | Peak (kW/m$^2$) | Peak Time (sec) | 2 min Total (kW * min/m$^2$) | Initial Baseline (mV) |
|---|---|---|---|---|
| 1 | 13.4 | 212 | 0.0 | 25.3 |
| 2 | 8.3 | 298 | 0.0 | 25.2 |
| 3 | 13.1 | 230 | 1.1 | 25.1 |
| Average | 11.6 | 247 | 0.4 | 25.2 |
| Stdev | 2.86 | | 0.64 | 0.10 |

As shown in Table 15, each of the three articles passed are fire retardant articles. Accordingly, each of the tested articles is fire resistant. Also, the Heat Release Burn Test: The total positive heat release rate for each of three or more samples tested must be averaged, and the peak heat release rate for each of the samples must be averaged. The average total heat release must not exceed 65 kW/m2, and average peak heat release rate must not exceed 65 kW/m$^2$.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

Particular example implementations of the subject matter have been described. As will be apparent to those skilled in the art, other implementations, alterations, and permutations of the particular implementations are considered to be within the scope of the disclosure and the following claims. Features of the various implementations are also combinable. While operations are depicted in the drawings or claims in a particular order, this should not be understood as requiring that such operations be performed in the particular order shown or in sequential order, or that all illustrated operations be performed (some operations may be considered optional), to achieve desirable results.

While this disclosure contains many specific implementation details, these should not be construed as limitations on the scope of any invention or on the scope of what may be claimed, but rather as descriptions of features that may be specific to particular implementations of particular inventions. Certain features that are described in the context of separate implementations can also be implemented, in combination, in a single implementation.

Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Accordingly, the previously described example implementations do not necessarily define or constrain this disclosure. Other changes, substitutions, and alterations are also possible within the scope of this disclosure.

To avoid unnecessarily obscuring the present disclosure, the preceding description may omit a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Also, while the flowcharts have been discussed and illustrated in relation to a particular sequence of events, it should be appreciated that changes, additions, and omissions to this sequence can occur without materially affecting the operation of the disclosed embodiments, configuration, and aspects. A number of variations and modifications of the disclosure can be used. It would be possible to provide for some features of the disclosure without providing others.

Moreover, though the description has included a description of one or more aspects, implementations, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An energy curable composition, the composition comprising:

at least one acrylate monomer/oligomer from about 40% to about 99% by weight of the energy curable composition;

at least one photoinitiator from about 1% to about 10% by weight of the energy curable composition; and at least one radical inhibitor from about 0.01% to about 0.5% by weight of the energy curable composition, wherein the radical inhibitor comprises tert-butyl catechol; 4 ter-butyl catechol; pyrogallol; phenothiazine; N-nitrosophenylhydroxylamine; N-nitrosophenylhydroxylamine aluminum salt; or a combination thereof.

2. The composition of claim 1, wherein the composition is curable using a radiation energy source having a wavelength in a range from about 355 nm to about 420 nm, and having a surface power density from about 1 $mW/cm^2$ to about 40 $mW/cm^2$.

3. The composition of claim 1, wherein the composition is a volatile organic compound (VOC) free composition.

4. The composition of claim 1, wherein the acrylate monomer/oligomer comprises tripropylene glycol diacrylate; triethylene glycol diacrylate; neopentyl glycol diacrylate; hexanediol diacrylate; trimethylolpropane triacrylate; trimethylolpropane ethoxylate triacrylate; tricyclodecane dimethanol diacrylate; tris(2-hydroxyethyl) isocyanurate triacrylate; or a combination thereof.

5. The composition of claim 1, wherein the photoinitiator comprises bisacyl phosphine oxide; diphenyl(2,4,6-trimethylbenzoyl) phosphine oxide; ethyl(2,4,6-trimethylbenzoyl)-phenyl phosphinate; bis(2,4,6-trimethylbenzoyl)-phenylphosphineoxide; or a combination thereof.

6. The composition of claim 1, wherein the radical inhibitor comprises N-nitrosophenylhydroxylamine; phenothiazine; N-nitrosophenylhydroxylamine aluminum salt; or a combination thereof.

7. An energy curable composition, the composition comprising:

at least one acrylate monomer/oligomer from about 40% to about 99% by weight of the energy curable composition;

at least one thiol monomer/oligomer from about 5% to about 40% by weight of the energy curable composition;

at least one photoinitiator from about 1% to about 10% by weight of the energy curable composition; and a radical inhibitor from about 0.01% to about 0.5% by weight of the energy curable composition, wherein the radical inhibitor comprises tert-butyl catechol; 4-tert-butyl catechol; pyrogallol; phenothiazine; N-nitrosophenylhydroxylamine; N-nitrosophenylhydroxylamine aluminum salt; or a combination thereof.

8. The composition of claim 7, wherein the thiol monomer comprises more than one thiol group.

9. The composition of claim 7, wherein the thiol monomer/oligomer comprise mercaptan; ethylene glycol; bis (thioglycolate); ethylene glycol bis(3-mercaptopropionate); pentaerythritol tetra(3-mercaptopropionate); trimethylolpropane tris(3-mercaptopropionate); pentaerythritol tetra(2-mercaptoacetate); trimethylolpropane tris(2-mercaptoacetate); 1,6-hexanedithiol; 1,2-benzenedithiol; 1,3-benzenedithiol; isophorone diurethane thiol; or combinations thereof.

10. The composition of claim 7, wherein the composition further comprises an additive selected from: a surface additive, a performance additive, a glass/silica filler, a pigment, or a combination thereof.

11. The composition of claim 10, wherein the additive is from about 0% to about 20% by weight of the energy curable composition.

12. The composition of claim 7, wherein the radical inhibitor comprises phenothiazine; N-nitrosophenylhydroxylamine; N-nitrosophenylhydroxylamine aluminum salt; or a combination thereof.

* * * * *